United States Patent
Reddy et al.

(10) Patent No.: US 9,646,508 B2
(45) Date of Patent: May 9, 2017

(54) DYNAMIC EVOLVING VIRTUAL CLASSROOM

(75) Inventors: Subodh M. Reddy, San Jose, CA (US); Kanji Uchino, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 753 days.

(21) Appl. No.: 13/539,109

(22) Filed: Jun. 29, 2012

(65) Prior Publication Data

US 2014/0004496 A1  Jan. 2, 2014

(51) Int. Cl.
  *G09B 7/02* (2006.01)
(52) U.S. Cl.
  CPC .................... *G09B 7/02* (2013.01)
(58) Field of Classification Search
  CPC ........................................... G09B 7/02
  USPC ............... 434/350, 336, 322, 362; 715/753; 707/754
  See application file for complete search history.

(56) References Cited

U.S. PATENT DOCUMENTS

| | | | |
|---|---|---|---|
| 5,437,555 A | 8/1995 | Ziv El | |
| 6,074,216 A | 6/2000 | Cueto | |
| 6,282,404 B1 * | 8/2001 | Linton | 434/350 |
| 6,546,405 B2 | 4/2003 | Gupta et al. | |
| 2002/0059342 A1 * | 5/2002 | Gupta | G06F 17/241 715/233 |
| 2005/0003330 A1 | 1/2005 | Asgarinejad et al. | |
| 2007/0048719 A1 | 3/2007 | He et al. | |
| 2009/0311658 A1 * | 12/2009 | Polivka | G09B 5/00 434/350 |
| 2010/0004944 A1 * | 1/2010 | Palaniappan | G06Q 10/10 705/1.1 |
| 2010/0221693 A1 * | 9/2010 | Gupta | 434/362 |
| 2012/0124486 A1 * | 5/2012 | Robinson et al. | 715/753 |

* cited by examiner

*Primary Examiner* — Thomas Hong
(74) *Attorney, Agent, or Firm* — Maschoff Brennan

(57) ABSTRACT

According to an aspect of an embodiment, a method of providing a virtual class includes providing access to temporally-dimensioned educational material to participants of the virtual class in a social network. The method may also include capturing supplemental material generated by the participants interacting with each other in real-time in the social network. The method may also include associating the supplemental material with a range of relative time within the temporally-dimensioned educational material. The method may also include providing the temporally-dimensioned educational material to a client device associated with a participant of the virtual class. The method may also include providing the supplemental material to the client device for presentation at the client device during the range of relative time within the temporally-dimensioned educational material.

17 Claims, 4 Drawing Sheets

DYNAMIC EVOLVING VIRTUAL CLASSROOM

FIELD

The embodiments discussed herein are related to virtual classrooms.

BACKGROUND

Distance learning, or virtual classes, via TV and/or the Internet, has been used as an alternative to live classroom education in schools. Virtual classes provide great flexibility, allowing participants of the virtual class to attend a class from their homes or other convenient locations without limiting the total number of students in the class. The class may be pre-recorded and played at different times to accommodate students with conflicting schedules. In the traditional distance learning technology, however, only limited interactions among the students and the teacher are possible. As a result, learning in virtual classes may be less effective than in live classroom settings.

SUMMARY

According to an aspect of an embodiment, a method of providing a virtual class includes providing access to temporally-dimensioned educational material to participants of the virtual class in a social network. The method may also include capturing supplemental material generated by the participants interacting with each other in real-time in the social network. The method may also include associating the supplemental material with a range of relative time within the temporally-dimensioned educational material. The method may also include providing the temporally-dimensioned educational material to a client device associated with a participant of the virtual class. The method may also include providing the supplemental material to the client device for presentation at the client device during the range of relative time within the temporally-dimensioned educational material.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

A virtual class as described herein may allow some participants of the virtual class to benefit from interactions with other participants as well as interactions between the other participants, regardless of when the participants participate in the virtual class.

In general, systems and methods of providing virtual classes as described herein may allow educational material to be presented to participants of the virtual class in a manner similar to a traditional class occurring in real-time. The educational material may include temporally-dimensioned educational material such as video content, audio content, animations, slideshows, or the like. The educational material may be temporally-dimensioned by being associated with a duration of time such as a playback time.

A social network may provide the participants with access to the temporally-dimensioned educational material. The participants of the virtual class may interact with each other in real-time using the social network to generate supplemental material. The virtual class may be dynamic insofar as supplemental material may be added to the virtual class. Moreover, the supplemental material may be captured and associated with a range of relative time within the temporally-dimensioned educational material, rather than associating the supplemental material with the real-time at which the supplemental material was generated.

The supplemental material may be subsequently provided to other participants of the virtual class during the range of relative time within the temporally-dimensioned educational material with which the supplemental material is associated as the other participants are viewing, listening to, or otherwise consuming the temporally-dimensioned educational material. In particular, as the temporally-dimensioned educational material is being consumed, the supplemental material may be presented beginning when the range of relative time within the temporally-dimensioned educational material is first reached and ending when the range of relative time terminates. In this manner, the supplemental material may be provided to the other participants in the same temporal context of the temporally-dimensioned educational material in which the supplemental material was generated and/or added to the temporally-dimensioned educational material, similar to how supplemental material may be discussed or generated in a live classroom setting. Thus, the virtual class may allow participants to receive temporally-dimensioned educational material and supplemental material in the same or a similar manner as in a live classroom setting while allowing the participants to consume the temporally-dimensioned educational material and/or supplemental material according to virtually any desired schedule.

Embodiments of the present invention will be explained with reference to the accompanying drawings.

Figure 1:
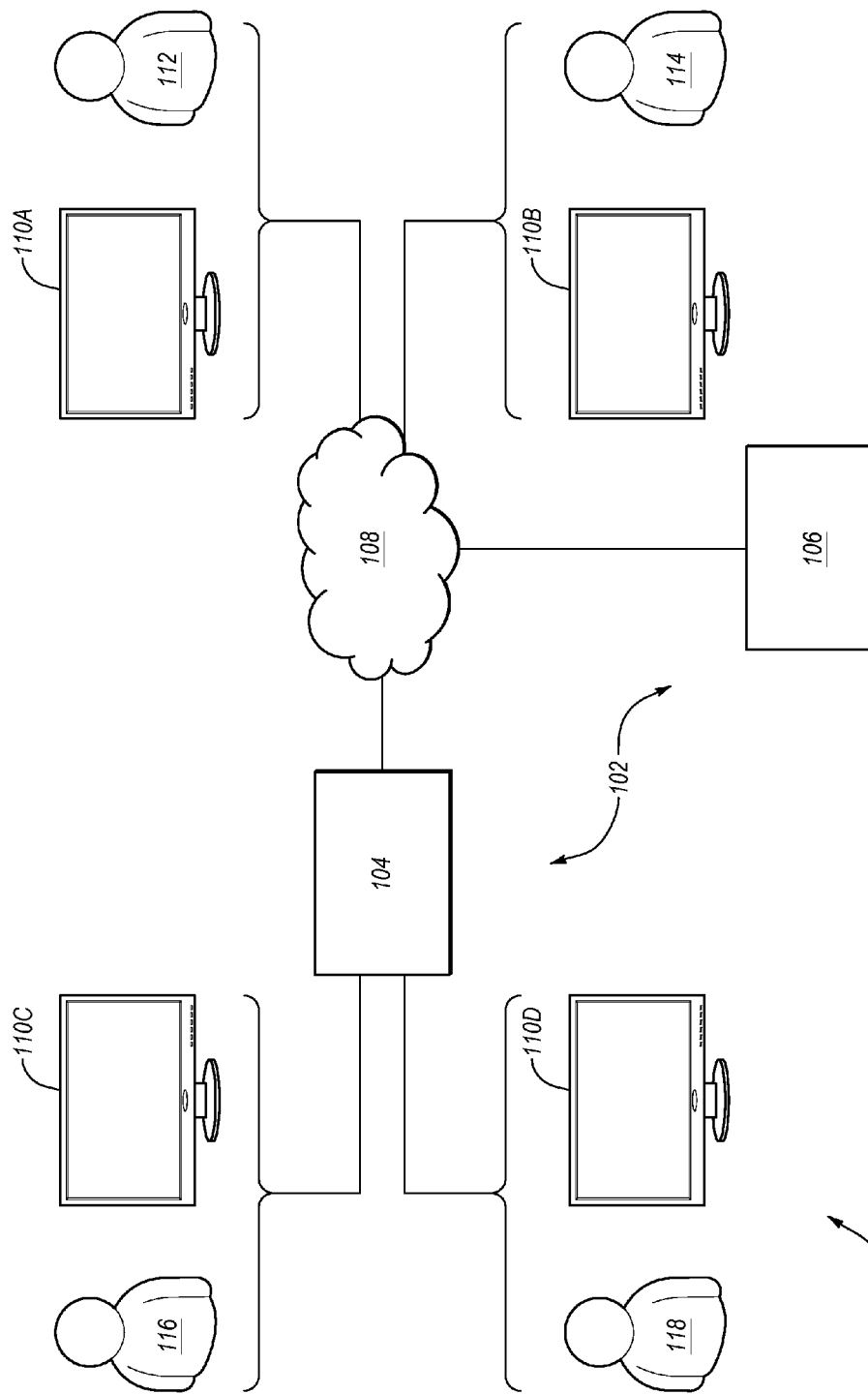
FIG. 1 illustrates an example operating environment in which a virtual class may be provided.

FIG. 1 illustrates an example operating environment 100 in which a virtual class may be provided. The operating environment 100 may include a system 102 of providing a virtual class, the system 102 including a server 104 and a social network 106. The operating environment 100 may further include one or more of a communication network 108 and one or more client devices 110A-110D (hereinafter collectively "client devices 110"). The system 102 may be configured to receive and/or provide temporally-dimensioned educational material and/or supplemental material from/to the client devices 110 via the communication network 108.

In general, the communication network 108 may communicatively couple the server 104 and one or more of the client devices 110 together. The communication network 108 may also communicatively couple the server 104 and one or more of the client devices 110 to the social network 106. Accordingly, the communication network 108 may include one or more wide area networks (WANs) and/or local area networks (LANs). In some embodiments, the communication network 108 includes the Internet, including a global internetwork formed by logical and physical connections between multiple WANs and/or LANs. Alternately or additionally, the communication network 108 may include one or more cellular RF networks and/or one or more wired and/or wireless networks such as, but not limited to, 802.xx networks, Bluetooth access points, wireless access points, IP-based networks, or the like. The communication network 108 may also include servers that enable one type of network to interface with another type of network.

Each of the client devices 110 may include, but is not limited to, a desktop computer, a laptop computer, a personal digital assistant (PDA), a smartphone, a tablet computer, or the like or any combination thereof. In general, each of the client devices 110 may be configured to communicate with the server 104 and/or other client devices 110 via the social network 106 and/or the communication network 108.

In the illustrated embodiment, each of the client devices 110A, 110B is associated with a corresponding participant 112, 114; the client device 110C is associated with an administrator 116; and the client device 110D is associated with a teacher 118. Although the client devices 110 have each been described as being associated with a particular person, such as one of the participants 112, 114, the administrator 116, or the teacher 118, respectively, any one or more of the client devices 110, such as the client device 110A, may be associated with other persons or more than one person or the like.

In the discussion that follows, the participants 112, 114, the administrator 116 and the teacher 118 may be described as performing certain actions, such as receiving material(s), adding or creating material(s), etc. Where not already explicitly stated, it is to be understood that the respective client devices 110 may be operated accordingly by the participants 112, 114, the administrator 116 and/or the teacher 118 to accomplish the recited actions.

In some embodiments, the participants 112, 114 include students or other persons that are taking the virtual class to learn about any of a variety of topics that may be offered in the form of a virtual class. The participants 112, 114 may use respective client devices 110A, 110B to access temporally-dimensioned educational material and/or supplemental material provided by the system 102. The administrator 116 may manage the operation of the system 102 via the client device 110C, while the teacher 118 may provide, e.g., upload, record in real-time, etc., temporally-dimensioned educational material via the client device 110D to the system 102 for the participants 112, 114 of the virtual class. Although FIG. 1 illustrates the administrator 116 and the teacher 118 as separate individuals and/or entities, the administrator 116 and the teacher 118 may instead be the same individual and/or the same entity without departing from the embodiments disclosed herein. Alternately or additionally, the same person may be both the teacher 118 for one virtual class and the participant 112 (or 114) for another virtual class, for example.

The social network 106 may be configured to provide, to participants 112, 114 of the virtual class, access to temporally-dimensioned educational material and/or supplemental material. Alternately or additionally, access to the temporally-dimensioned educational material and/or the supplemental material may be provided by the server 104. Moreover, the social network 106 may also be configured to allow the participants 112, 114 to interact with each other in real-time to generate supplemental material. In some embodiments, the social network 106 may also be configured to allow the participants 112, 114 to interact with the administrator 116 and/or the teacher 118.

The server 104 may be configured to capture supplemental material added by the participants 112, 114 and/or by the administrator 116 and/or the teacher 118. The captured supplemental material may be associated by the server 104 with a range of relative time within the temporally-dimensioned educational material. The server 104 may also be configured to provide the supplemental material to one or more of the client devices 110A, 110B for presentation at one or more of the client devices 110A, 110B during the relative range of time within the temporally dimensioned educational material.

The social network 106 may provide, to the participant 112 (hereinafter "first participant 112"), access to temporally-dimensioned educational material, such as a biology presentation. The biology presentation may be temporally-dimensioned content such as a video or audio recording of a biology lecture and may have, for example, a duration of ten minutes. While the first participant 112 is consuming, e.g., viewing or listening to, the biology presentation, the first participant may engage in an instant messaging (IM) session or otherwise interact with the teacher 118 in real-time via the social network 106 to clarify some aspect of the biology presentation that was unclear to the first participant 112. By way of example, the real-time IM session may occur beginning at two minutes into the biology presentation and ending at three minutes into the biology presentation, or perhaps at a particular relative point in time of the biology presentation while the biology presentation is paused or stopped, such as exactly two minutes and thirty seconds into the biology presentation.

The IM session may be captured by the server 104 and stored as supplemental material to the biology presentation. Moreover, the server 104 may associate the captured IM session with a particular range of relative time within the biology presentation, such as a relative range corresponding to the relative range when the IM session occurred (e.g., beginning at two minutes and ending at three minutes into the biology presentation), or a range beginning at some relative point in time prior to the particular relative point in time when the IM session occurred and ending at some relative point in time after the particular relative point in time (e.g., beginning at ten seconds prior to and ending at ten seconds after two minutes and thirty seconds into the biology presentation), or some combination thereof.

Subsequently, the participant 114 (hereinafter "the second participant 114") may access the temporally-dimensioned educational material including the biology presentation from the server 104 and/or the social network 106 using the client device 110B. The server 104 may also provide supplemental material including the captured IM session to the second participant 114. Accordingly, the supplemental material including the captured IM session may be presented to the second participant 114 at the client device 110B during the associated range of relative time within the temporally-dimensioned educational content as it is being consumed by the second participant 114.

Alternatively or additionally, the server 104 may be configured to leverage features of the social network 106, including attributes of the participants 112, 114 and/or associations within the social network 106 of the participants 112, 114, to perform recommendation and/or filtering operations within the system 102. In these and other embodiments, there may be multiple units of supplemental material associated with a given unit of temporally-dimensioned educational material, which units of supplemental material may be generated at or by a variety of different sources. The multiple units of supplemental material may include, e.g., a first unit of supplemental material, a second unit of supplemental material, etc. The various units of supplemental material may generically be referred to herein collectively and/or individually as "supplemental material", and may sometimes be referred to specifically as a "unit" or "units" of supplemental material for clarity in certain circumstances.

In some embodiments, the social network 106 may include a profile of the first participant 112. The profile may include one or more attributes of the first participant 112. The server 104 may be configured to access the profile of the first participant 112 from the social network 106. In some embodiments, the server 104 may be configured to filter supplemental material (or more particularly, the units of supplemental material) provided to the participants 112, 114 based on the profiles of the participants 112, 114. For instance, the server 104 may be configured to filter the units of supplemental material associated with a given unit of temporally-dimensioned educational material to provide to the participants 112, 114 only supplemental material comprising one or more attributes related to the attributes of the respective participant's 112, 114 profile.

For example, the temporally-dimensioned educational material may include a driver education course generally covering aspects of driving applying to any motorized vehicle, including, e.g., automobiles, buses, and motorcycles. The profile of the first participant 112 in the social network 106 may include an attribute indicating that the first participant has a motorcycle driver's license and a motorcycle, but does not have an automobile. As such, the first participant 112 may primarily be interested in aspects of driver education that are specific to motorcycle driving. Accordingly, the server 104 may be configured to filter the supplemental material provided to the client device 110B associated with the first participant 112 by providing only supplemental material related to motorcycle driving.

Alternatively or additionally, the social network 106 may identify a set of participants within the social network 106 that are associated with the first participant 112 based on the profile of the first participant 112. The server 104 may be further configured to recommend to the first participant 112 a mentoring relationship with at least one of the associated set of participants. For example, the server 104 may recommend to the first participant 112 a mentoring relationship with the second participant 114 based at least on the second participant 114 belonging to the set of participants associated with the first participant 112. The recommendation may also be based on one or more other factors, such as the first participant 112 having already taken a particular virtual class in which the second participant 114 is currently enrolled, having a relatively better grade in a virtual class in which both the first and second participants 112, 114 are both current enrolled, or the like.

Alternatively or additionally, the server 104 may be configured to filter supplemental material based on the associations of the participants 112, 114. For example, the second participant 114 may be associated with the first participant 112 within the social network 106. As such, the server 104 may filter supplemental material to provide to the first participant 112 supplemental material added by the second participant 112, while not providing to the first participant 112 supplemental material added by participants not associated with the first participant.

Various ways of filtering supplemental material are described herein, including filtering according to attributes and filtering according to source. Other criteria may alternately or additionally be used to filter supplemental material that is provided to the participants 112, 114. In these and other embodiments, an amount of supplemental material associated with particular temporally-dimensioned content may accumulate over time and eventually become excessive such that it may be unreasonable to provide all of the supplemental material to participants 112, 114 while the participants 112, 114 are consuming the particular temporally-dimensioned content. For this and other reasons, it may be desirable to filter the supplemental material that is provided to the participants 112, 114 according to criteria such as those described herein.

Moreover, as described herein, supplemental material generated in a virtual class by any of a variety of sources may be captured and associated with a range of relative time within corresponding temporally-dimensioned educational material. As such, the virtual class may be dynamic and allow supplemental material to be added over time so that participants 112, 114 are able to experience a virtual class in a manner similar to a traditional class in a classroom setting. Alternatively or additionally, by filtering the supplemental material provided to the participants 112, 114, the participants 112, 114 may avoid being flooded with an excessive amount of supplemental material.

Figure 2:
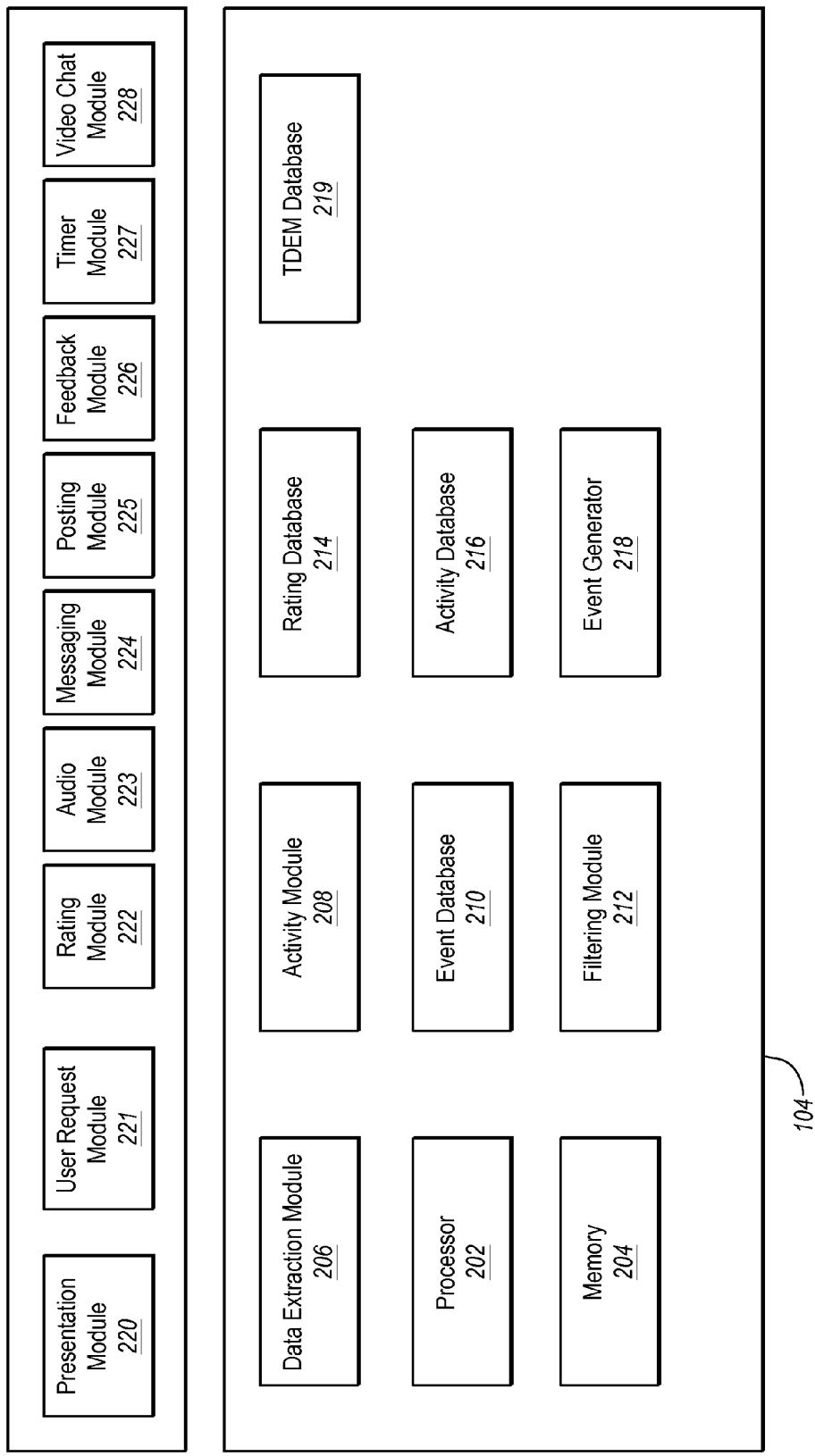
FIG. 2 is a block diagram of an example embodiment of a server that may be implemented in the operating environment of FIG. 1 to provide the virtual class.

With additional reference to FIG. 2, a block diagram of an example embodiment of the server 104 is provided. As shown, the server 104 may include a processor 202 and a memory 204. The processor 202 may be configured to execute computer instructions that cause the system 102 to perform functions and operations associated with providing a virtual class, such as one or more of the functions and operations described herein. The computer instructions may be loaded into the memory 204 for execution by the processor 202 and/or data generated, received or operated on during performance of the functions and operations described herein may be at least temporarily stored in the memory 204.

The server 104 may further include one or more of a data extraction module 206, an activity module 208, an event database 210, a filtering module 212, a rating database 214, an activity database 216, an event generator 218 and a temporally-dimensioned educational material (TDEM) database 219. In general, the server 104 may correspond to a back end of the system 102 of FIG. 1.

Moreover, the server 104 may be configured to communicate with one or more client modules 220-228 installed on a client device, such as any of the client devices 110 of FIG. 1. The client modules 220-228 include a presentation module 220, a user request module 221, a rating module 222, an audio module 223, a messaging module 224, a posting module 225, a feedback module 226, a timer module 227, and a video chat module 228. The client modules 220-228 may correspond to a front end of the system 102 of FIG. 1. In some embodiments, some or all of the client modules 220-228 may be provided by or included as part of the social network 106 of FIG. 1.

The presentation module 220 may be configured to provide temporally-dimensioned educational material included in the TDEM database 219 to participants in one or more formats including audio format and/or visual format. The participants may include, for example, the first participant 112 and the second participant 114 of FIG. 1, as well as other participants of the virtual class.

The user-request module 221 may be configured to allow participants to request the temporally-dimensioned educational material from the server 104, such as temporally-dimensioned educational material stored in the TDEM database 219.

Participants may add supplemental material using any one or more of the client modules 222-228 while temporally-dimensioned educational material is being consumed by the participants. The supplemental material may take any of a variety of forms, such as video recordings, text files, audio recordings, uploaded documents, or links to content available on a network.

For example, the video chat module 228 may be configured to allow participants to have video conversations with each other. The video conversations may be recorded and captured by the activity module 208 as supplemental material.

The audio module 223 may be configured to allow participants to have conversations with each other in audio formats such as an audio chat. Such conversations may be saved as an audio recording and captured by the activity module 208 as supplemental material.

The messaging module 224 may be configured to allow two or more participants to have conversations with each other in text formats such as IM formats. The textual content of such conversations may be saved in a text file or other suitable file and captured by the activity module 208 as supplemental material.

The posting module 225 may be configured to allow participants to upload documents or to post links, such as Uniform Resource Identifier (URI) links or Uniform Resource Locator (URL) links, to content available on a network, such as the network 108. The uploaded documents may include word processing files, spreadsheets, images, or other documents. The content available at the URI links or other addresses may include HyperText Markup Language (HTML) documents or other documents, for example. The uploaded documents and/or the posted links may be captured by the activity module 208 as supplemental material. Video recordings, audio recordings, text files, uploaded documents and URI/URL links are all examples of units of supplemental material.

As previously indicated, the supplemental material may be associated with a relative range of time within corresponding temporally-dimensioned educational material. Accordingly, the timer module 227 may be configured to monitor and identify the range of relative time within the temporally-dimensioned educational material corresponding to when the supplemental material is generated. The activity database 216 may be configured to store the supplemental material, and the event database 211 may be configured to store data indicating the range of relative time associated with the captured supplemental material as identified by the timer module 227. The event generator 213 may be configured to trigger a time event based on the range of relative time associated with the captured supplemental material.

For example, after generation of the supplemental material and while one of the participants is consuming the corresponding temporally-dimensioned educational material, the data extraction module 217 may be configured to provide the captured supplemental material to the corresponding participant such that the supplemental material may be presented to the participant during the range of relative time of the temporally-dimensioned educational material with which the captured supplemental material is associated. The supplemental material may be presented to the participant by a corresponding one of the client modules.

For instance, supplemental material such as a video recording may be presented to the participant by the video chat module 228. Similarly, supplemental material such as audio recordings, text files, and uploaded documents/links may be respectively presented to the participant by the audio module 223, the messaging module 224, and the posting module 225.

A specific example will now be described with combined reference to FIGS. 1-2. While viewing (e.g., consuming) a fifteen-minute lecture on amphibians (e.g., temporally-dimensioned educational material), the first participant 112 may upload, using the posting module 225 on the client device 110A, a document related to frogs (e.g., supplemental material). The document may be uploaded at about four minutes (e.g., a particular relative time) into the fifteen-minute lecture and may be captured by the activity module 208 for storage in the activity database 216. The timer module 227 may monitor and identify that the document was uploaded at about four minutes into the lecture, and/or at about four minutes into the lecture plus or minus fifteen seconds (e.g., a range of relative time), which range of relative time may be associated with the document. Data indicating the range of relative time may be saved in the event database 210.

Alternatively or additionally, the first participant 112 may have a conversation with the teacher 118 using the audio module 223, the messaging module 224 and/or the video chat module 228, which conversation may be recorded. The recorded conversation (e.g., supplemental material) may have occurred from about eleven minutes to about twelve minutes and thirty seconds (e.g., a range of relative time) within the lecture. The timer module 227 may monitor and identify the range of relative time over which the conversation occurred and may associate the range of relative time with the conversation. The activity database 216 may store the conversation as supplemental material, and the event database 210 may store data indicating the corresponding range of relative time, including data indicating the range from eleven minutes to twelve minutes and thirty seconds in this example.

When the second participant 114 subsequently views the lecture, the event generator 218 may trigger a first time event at the beginning of the range of relative time associated with the uploaded document, or at about three minutes and forty-five seconds in this example. In response to the first time event, the data extraction module 206 may retrieve the uploaded document from the activity database 216 and may provide it to the client device 110B for presentation to the second participant 114. For instance, the uploaded document may be presented on the client device 110B by the posting module 225.

The event generator 218 may similarly trigger a second time event at the beginning of the range of relative time associated with the conversation, or at about eleven minutes in this example. In response to the second time event, the data extraction module 206 may retrieve the conversation from the activity database 216 and may provide it to the client device 110B for presentation to the second participant 114. For example, the conversation may be presented on the client device 110B by the audio module 223, the messaging module 224, and/or the video chat module 228.

With continued reference to FIGS. 1-2, the feedback module 226 may be configured to allow the participants to leave feedback, e.g., for the administrator 116 and/or the teacher 118 of the temporally-dimensioned educational material. For example, the participants 112, 114 may use the feedback module 226 to leave comments for the administrator 116, and/or for the teacher 118, relating to technical issues encountered while consuming temporally-dimensioned educational material and/or supplemental material; relating to temporally-dimensioned educational material and/or portions thereof which the participants 112, 114 found particularly helpful, irrelevant, unclear, or the like; and/or relating to other topics.

The rating module 222 may be configured to allow participants to rate, based on a rating system, the supplemental material stored in the activity database 216. The rating database 214 may store the ratings associated with the supplemental material stored in the activity database 216. In some embodiments, the rating module 222 may be combined into the messaging module 224 or another one of the client modules 220-228.

As mentioned above with respect to FIG. 1, the server 104 may be configured to utilize the social network 106 including the attributes and the associations of the participants 112, 114 of the virtual class, to perform recommendation and/or filtering operations within the system 102. In these and other embodiments, the recommendation and/or filtering operations may be performed by the filtering module 212.

In some embodiments, instead of or in addition to performing the recommendation and/or filtering operations already described above, the filtering module 210 may be configured to filter supplemental material based on respective ratings assigned to the supplemental material. Where a given unit of supplemental material has multiple ratings, the filtering may be based on an average of the multiple ratings, for instance. In some embodiments, filtering the supplemental material based on assigned ratings may include filtering out any of the supplemental material having a rating below a predetermined threshold. The predetermined threshold may be specified by, e.g., a corresponding one of the participants 112, 114, the administrator 116 and/or the teacher 118, for example.

Figure 3:
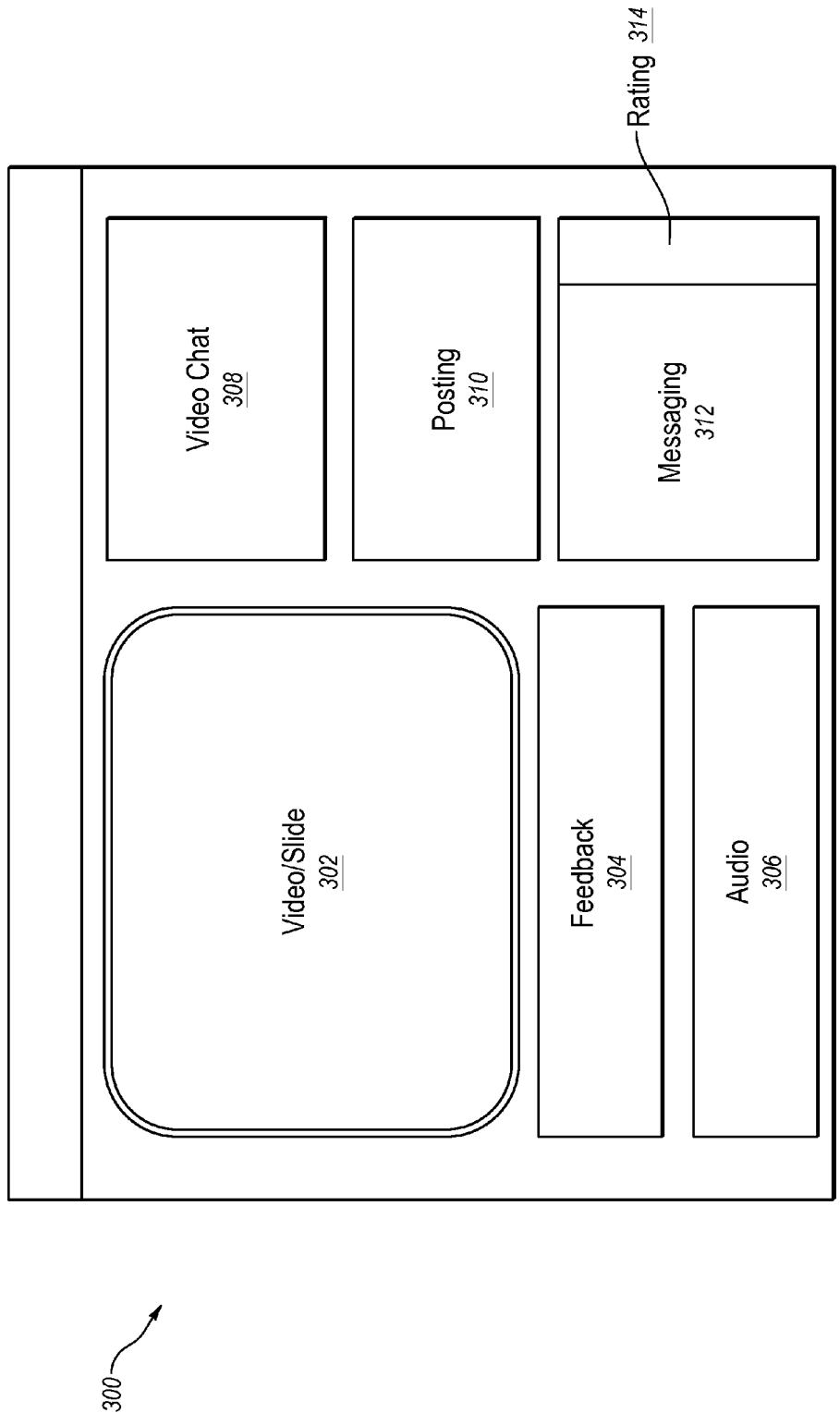
FIG. 3 illustrates an example embodiment of a user-interface which may be implemented on a client device in the operating environment of FIG. 1.

According to some embodiments, at least some of the various client modules 220-228 may correspond to components of a user-interface provided on the client devices 110 of FIG. 1 to allow the participants 112, 114, the administrator 116 and/or the teacher 118 to access and/or generate temporally-dimensioned educational material and/or supplemental material. Accordingly, FIG. 3 illustrates an example embodiment of a user interface 300 which may be implemented on any of the client devices 110 of FIG. 1. As illustrated, the user interface 300 includes a video/slide component 302, a feedback component 304, an audio component 306, a video chat component 308, a posting component 310, a messaging component 312, and a rating component 314.

With combined reference to FIGS. 2 and 3, the various components 302, 304, 306, 308, 310, 312, 314 of the user-interface 300 may correspond to some of the client modules 220-228. For example, the video/slide component 302 may include an area of the user interface 300 in which the presentation module 220 may present temporally-dimensioned educational material and/or controls—such as rewind, pause, and fast forward—for controlling playback of the temporally-dimensioned educational material. Alternately or additionally, and prior to beginning playback of the temporally-dimensioned educational material, the user request module 221 may accept user input via fields presented in the video-slide component 302 of the user interface 300 to identify particular temporally-dimensioned educational material requested for consumption.

The feedback component 304 may represent an area of the user interface 300 in which comments and/or other feedback may be received from a user, such as a participant, teacher, administrator, etc., by the feedback module 226.

The audio component 306 may correspond to the audio module 223. In particular, the audio component 306 may include controls and/or fields for facilitating an audio chat between the user and another person and/or controls and/or fields for facilitating the presentation of supplemental material including audio recordings to the user by the audio module 223. For example, the audio component 306 may include interface elements for selecting and paging or otherwise contacting the person with whom the audio chat is desired. Alternately or additionally, interface elements may be presented or altered within the audio component 306 to indicate the availability of supplemental material during playback of temporally-dimensioned educational material in the video/slide component 302. Controls may also be provided within the messaging component 306 for controlling the playback of the supplemental material.

The video chat component 308 may correspond to the video chat module 228. In particular, the video chat component 308 may include controls and/or fields for facilitating a video chat between the user and another person and/or controls and/or fields for facilitating the presentation of supplemental material including video recordings to the user by the video chat module 228. For example, the video chat component 308 may include interface elements for selecting and paging or otherwise contacting the person with whom the video chat is desired, and the video chat component 308 may also include an area for presenting a video stream from the person with whom the video chat is desired. Alternately or additionally, interface elements may be presented or altered within the video chat component 308 to indicate the availability of supplemental material including a recorded video chat during playback of temporally-dimensioned educational material in the video/slide component 302 and/or areas may be provided for presenting two or more recorded video streams of individuals involved in the supplemental material including the recorded video chat. Controls may also be provided within the video chat component 306 for controlling the playback of the supplemental material.

The posting component 310 may correspond to the posting module 225. In particular, the posting component 310 may include controls and/or fields for facilitating the upload of documents and/or the posting of links and/or controls and/or fields for facilitating the presentation of supplemental material including uploaded documents and/or links to the user by the posting module 225. For example, the posting component 310 may include interface elements for selecting documents to upload and/or posting links to documents on a network. Alternately or additionally, interface elements may be presented or altered within the posting component 310 to indicate the availability of supplemental material including an uploaded document or posted link during playback of temporally-dimensioned educational material in the video-slide component 302.

The messaging component 312 may correspond to the messaging module 224. In particular, the messaging component 312 may include controls and/or fields for facilitating an IM session between the user and another person and/or controls and/or fields for facilitating the presentation of supplemental material including textual content of IM sessions between other persons to the user by the messaging module 224. For example, the messaging component 312 may include interface elements for selecting and paging or otherwise contacting the person with whom the IM session is desired. Alternately or additionally, interface elements may be presented or altered within the messaging component 312 to indicate the availability of supplemental material during playback of temporally-dimensioned educational material in the video/slide component 302. The actual textual content of such supplemental material may be presented in the messaging component 312 or in an area thereof.

The rating component 314 may correspond to the rating module 222. The rating component 314 may thus include controls and/or fields for receiving a rating by the user of temporally-dimensioned educational material and/or of supplemental material, for presenting ratings provided by others, or the like or any combination thereof.

Figure 4:
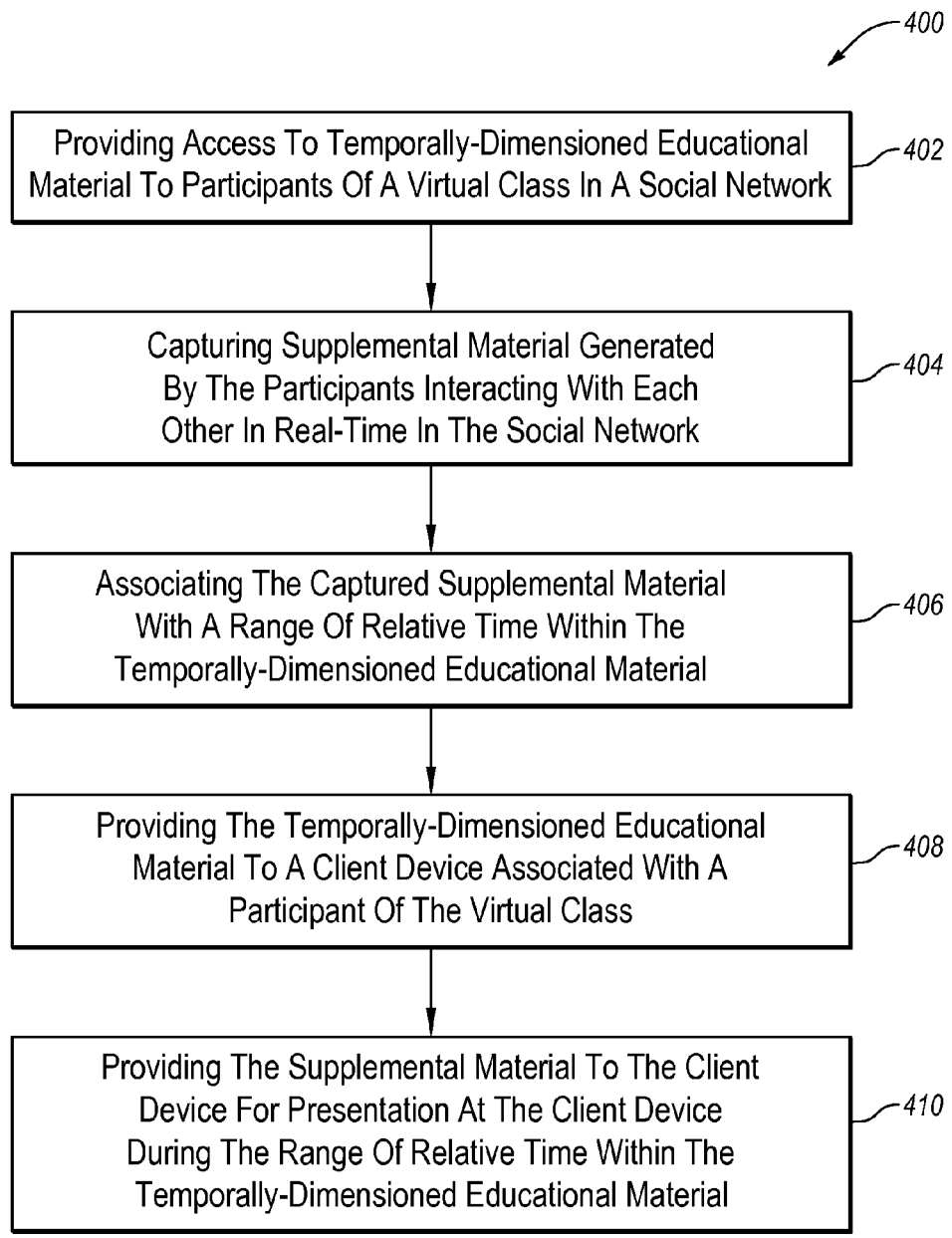
FIG. 4 is a flowchart of an example method of providing a virtual class in the operating environment of FIG. 1.

FIG. 4 is a flowchart of an example method 400 of providing a virtual class. The method 400 may be implemented, in some embodiments, by a system, such as the system 102 of FIG. 1. For instance, the processor 202 of the server 102 of FIG. 2 may be configured to execute computer instructions to provide a virtual class as represented by one or more of blocks 402, 404, 406, 408, and/or 410 of the method 400. Although illustrated as discrete blocks, various blocks may be divided into additional blocks, combined into fewer blocks, or eliminated, depending on the desired implementation.

The method 400 may begin at block 402 in which access to temporally-dimensioned educational material may be provided to participants of a virtual class in a social network. The social network may allow the participants to interact with each other and/or with other users such as teachers and/or administrators to generate supplemental material for the temporally-dimensioned educational material, as already described herein.

In block 404, supplemental material generated by the participants interacting with each other in real-time in the social network may be captured. For example, participants or a participant and a teacher or the like may engage in a real-time conversation (e.g., via IM session, audio chat, and/or video chat) concerning the temporally-dimensioned educational material or an aspect thereof that was unclear or for which additional information may be desired.

In block 406, the supplemental material may be associated with a range of relative time within the temporally-dimensioned content. The range of relative time with which the supplemental material is associated may correspond to a range of relative time within the temporally-dimensioned content during which the supplemental material was generated, or to a range of relative time surrounding a particular relative time at which the supplemental material was generated.

In block 408, the temporally-dimensioned educational material may be provided to a client device associated with a participant of the virtual class.

In block 410, the supplemental material may be provided to the client device for presentation at the client device during the range of relative time within the temporally-dimensioned content.

One skilled in the art will appreciate that, for this and other processes and methods disclosed here, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 400 may be configured to use the social network including the attributes and the associations of the participants in the virtual class, to perform recommendation and/or filtering operations and/or steps. In these and other embodiments, the supplemental material may include a unit of supplemental material from among multiple units of supplemental material. The social network may include a profile of the participant. The profile may include one or more attributes of the participant.

In these and other embodiments, the method 400 may also include accessing the profile of the participant from the social network. A set of participants that are associated with the participant may be identified based on the profile of the participant.

The method 400 may also include filtering the multiple units of supplemental material provided to the participant based on the profile of the participant. For example, filtering the multiple units of supplemental material based on the profile of the participant may include filtering the multiple units of supplemental material based on one or more participants who added the multiple units of supplemental material to provide to the participant units of supplemental material added by at least one of the associated set of participants while excluding units of supplemental material added by others. Alternately or additionally, filtering the multiple units of supplemental material based on the profile of the participant may include filtering the multiple units of supplemental material based on one or more attributes of the multiple units of supplemental material to provide to the participant units of supplemental material including one or more attributes related to attributes of the participant's profile.

The method 400 may also include recommending to the participant a mentoring relationship with at least one of the associated set of participants The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The subject matter claimed herein is not limited to embodiments that solve any disadvantages or that operate only in environments such as those described above. Rather, this description is only provided to illustrate some example technology areas where some embodiments described herein may be practiced.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A system of providing a virtual class, comprising:
    a social network configured to allow participants of a virtual class to interact with each other in real-time and generate supplemental material related to temporally-dimensioned educational material, wherein the supplemental material includes one or more units of supplemental material related to the temporally-dimensioned educational material, wherein the social network includes a profile of the participant; the profile comprises one or more attributes of the participant; and
    a server communicatively coupled to the social network, the server configured to:
    provide access to the temporally-dimensioned educational material to the participants of the virtual class, wherein the participants comprise students;
    capture the one or more units of supplemental material in real time during the virtual class;
    associate the one or more units of supplemental material with a corresponding range of relative time within the temporally-dimensioned educational material;
    provide the temporally-dimensioned educational material via a participant user interface of a client device associated with a participant of the virtual class, wherein at least one unit of supplement material is received from the participant via the participant user interface;
    determine one or more ratings associated with the one or more units of supplemental material;
    access the profile of the participant from the social network;
    identify a set of participants within the social network that are associated with the participant based on the profile of the participant;
    filter the one or more units of supplemental material based on the one or more ratings and one or more attributes of the one or more units of supplemental material comprising one or more attributes related to the attributes of the profile of the participant to output at least one unit of supplemental material that associates with a corresponding rating satisfying a predetermined threshold; and
    provide the at least one unit of supplemental material to the client device for presentation at the client device during the corresponding range of relative time within the temporally-dimensioned educational material.

2. The system of claim 1, wherein the server is configured to filter the one or more units of supplemental material by filtering the one or more units of supplemental material based on one or more participants who added the one or more units of supplemental material to provide to the participant the at least one unit of supplemental material added by at least one of the associated set of participants.

3. The system of claim 1, wherein the server is further configured to recommend to the participant a mentoring relationship with at least one of the associated set of participants.

4. The system of claim 1, the server comprising:
    an activity database configured to store the supplemental material; and
    an event database configured to store data indicating the corresponding range of relative time associated with the one or more units of supplemental material.

5. The system of claim 1, the server comprising:
    an event generator configured to trigger a time event based on the corresponding range of relative time associated with the at least one unit of supplemental material; and
    a data extraction module configured to provide the at least one unit of supplemental material to the client device associated with the participant over the corresponding range of relative time associated with the at least one unit of supplemental material in response to the time event triggered by the event generator.

6. The system of claim 5, further comprising a presentation module configured to provide the temporally-dimensioned educational material to the participants in one or more formats comprising at least one of an audio format and a video format.

7. The system of claim 1, wherein the supplemental material comprises one or more of:
    an audio recording;
    a video recording;
    a text file including textual content of messages exchanged between the participants of the virtual class;
    an uploaded document; and
    a link to content available on a network.

8. The system of claim 1, wherein the server comprises one or more of:
    a feedback module configured to allow the participants to leave feedback for an administrator of the temporally-dimensioned educational material;
    a video chat module configured to allow the participants to have video conversations with each other;
    an audio module configured to allow the participants to have audio conversations with each other;
    a messaging module configured to allow the participants to have textual conversations with each other;
    a posting module configured to allow the participants to upload documents or post links to documents; and
    a rating module configured to allow the participants to rate the supplemental material based on a rating system such that the one or more ratings are assigned to the one or more units of supplemental material.

9. The system of claim 8, wherein the server comprises a filtering module configured to filter the one or more units of supplemental material.

10. The system of claim 9, wherein the filtering module is configured to filter the one or more units of supplemental material by filtering out any of the one or more units of supplemental material having a rating below the predetermined threshold.

11. A method of providing a virtual class, comprising:
providing access to temporally-dimensioned educational material to participants of the virtual class in a social network, wherein the participants comprises students;
capturing supplemental material generated by the participants interacting with each other in real-time in the social network, wherein the supplemental material includes one or more units of supplemental material related to the temporally-dimensioned educational material;
associating the one or more units of supplemental material with a corresponding range of relative time within the temporally-dimensioned educational material;
providing the temporally-dimensioned educational material via a participant user interface of a client device associated with a participant of the virtual class, wherein at least one unit of supplement material is received from the participant via the participant user interface;
determining one or more ratings associated with the one or more units of supplemental material;
accessing the profile of the participant from the social network;
identifying a set of participants within the social network that are associated with the participant based on the profile of the participant;
filtering the one or more units of supplemental material based on the one or more ratings and one or more attributes of the one or more units of supplemental material to provide to the participant the at least one unit of supplemental material comprising one or more attributes related to the attributes of the profile of the participant to output at least one unit of supplemental material that associates with a corresponding rating satisfying a predetermined threshold; and
providing the at least one unit of supplemental material to the client device for presentation at the client device during the corresponding range of relative time within the temporally-dimensioned educational material.

12. The method of claim 11, wherein the filtering comprises filtering the one or more units of supplemental material based on one or more participants who added the one or more units of supplemental material to provide to the participant the at least one unit of supplemental material added by at least one of the associated set of participants.

13. The method of claim 11, further comprising recommending to the participant a mentoring relationship with at least one of the associated set of participants.

14. The method of claim 11, further comprising storing:
the supplemental material in an activity database; and
data indicating the corresponding range of relative time associated with the one or more units of supplemental material in an event database.

15. The method of claim 11, further comprising:
triggering a time event based on the corresponding range of relative time associated with the at least one unit of supplemental material; and
providing the at least one unit of supplemental material to the client device over the corresponding range of relative time associated with the at least one unit of supplemental material in response to the time event.

16. A processor configured to execute computer instructions to cause a system to perform operations to provide a virtual class, the operations comprising:
providing access to temporally-dimensioned educational material to participants of the virtual class in a social network, wherein the participants comprises students;
capturing supplemental material generated by the participants interacting with each other in real-time in the social network, wherein the supplemental material includes one or more units of supplemental material related to the temporally-dimensioned educational material;
associating the one or more units of supplemental material with a corresponding range of relative time within the temporally-dimensioned educational material;
providing the temporally-dimensioned educational material via a participant user interface of a client device associated with a participant of the virtual class, wherein at least one unit of supplement material is received from the participant via the participant user interface;
accessing the profile of the participant from the social network;
identifying a set of participants within the social network that are associated with the participant based on the profile of the participant;
determining one or more ratings associated with the one or more units of supplemental material;
filtering the one or more units of supplemental material based on the one or more ratings and one or more attributes of the one or more units of supplemental material to provide to the participant the at least one unit of supplemental material comprising one or more attributes related to the attributes of the profile of the participant to output at least one unit of supplemental material that associates with a corresponding rating satisfying a predetermined threshold; and
providing the at least one unit of supplemental material to the client device for presentation at the client device during the corresponding range of relative time within the temporally-dimensioned educational material.

17. The processor of claim 16, wherein the filtering comprises filtering the one or more units of supplemental material based on one or more participants who added the one or more units of supplemental material to provide to the participant the at least one unit of supplemental material added by at least one of the associated set of participants.

* * * * *